United States Patent [19]

Besenbruch et al.

[11] 4,140,032
[45] Feb. 20, 1979

[54] TOOL HOLDER ASSEMBLY FOR BRAKE DRUM AND BRAKE DISC

[75] Inventors: Alex Besenbruch; Franz Krause, both of Isabella, P.R.

[73] Assignee: Besenbruch-Hofmann of Puerto Rico, Inc., Isabella, P.R.

[21] Appl. No.: 863,943

[22] Filed: Dec. 23, 1977

[51] Int. Cl.$^2$ .............................................. B23B 5/04
[52] U.S. Cl. ............................. 82/4 A; 51/DIG. 3; 51/106 R; 29/560
[58] Field of Search ........ 82/4 A; 51/DIG. 3, 106 R; 29/560

[56] References Cited

U.S. PATENT DOCUMENTS 3,540,165  11/1970  Lanham ................................. 82/4 A

FOREIGN PATENT DOCUMENTS 1378424  10/1964  France ......................................... 82/4 A

*Primary Examiner*—Leonidas Vlachos
*Attorney, Agent, or Firm*—Edward H. Loveman

[57] ABSTRACT

A tool holder assembly mountable on a lathe housing for dressing cylindrical and flat walls of drums and disc shaped work pieces respectively, has a mounting plate formed with two mutually perpendicular walls each carrying a short drive shaft. The assembly may be disposed in one position with one wall at the lathe housing so that one shaft is driven by a lathe motor in dressing a drum. The assembly may be disposed in another position with the other wall at the lathe housing so that the other shaft is driven by the lathe motor in dressing a disc.

10 Claims, 6 Drawing Figures

TOOL HOLDER ASSEMBLY FOR BRAKE DRUM AND BRAKE DISC

This invention relates to the art of machine tools, and more particularly concerns a tool holder assembly adapted to hold and move a grinding or cutting tool in a lathe used for dressing a rotating brake drum, brake disc, or other cylindrical or disc shaped article. In dressing cylindrical article the tool moves axially of the rotating cylinder. In dressing a flat disc shaped article, the tool moves radially of the rotating disc-like article.

In my copending U.S. patent application entitled: "Work Holder For a Lathe Used In Dressing Cylindrical And Disc Shaped Articles" filed Dec. 23, 1977, under Ser. No. 863,940 there is described a novel anti-chatter, aligning plate adapted to hold and straighten a drum or disc mounted on a rotary spindle in a lathe used for dressing the drum or disc.

The present invention is concerned with a tool holder assembly which in one position supports a tool for grinding or cutting a wall of a cylindrical drum or rotor, and which in another position supports a tool for grinding a face of a disc or other flat article. Heretofore it has been conventional to use two different types of grinding machines for dressing cylindrical and disc shaped articles. Lathes are known which can dress either a cylindrical or disc shaped piece of work, but they are large, complex, and expensive. For a shop which does brake drum or disc brake grinding infrequently, such as once or twice a week, installation of either the complex lathe or two special purpose lathes, is prohibitively expensive. Furthermore they require skilled mechanics to set them up and to operate them.

The present invention is directed at overcoming the above and other difficulties of prior drum and disc grinding machines by providing a novel tool holder assembly which adapts a single simplified lathe to dress both cylindrical and flat disc-like pieces of work.

According to the invention there is provided a tool holder assembly having a tool holder plate formed with notches for engaging a grinding tool. The tool holder plate is movably mounted on slide rods and is advanced by a lead screw axially or radially of a piece of work. The tool holder plate and slide rods are supported by a generally L-shaped cross slide plate having two mutually perpendicular front and side walls. When the front wall is secured in position at a front vertical front wall of a lathe housing the slide rods extend perpendicularly to the housing wall, and the tool holder plate moves toward the housing wall carrying a grinding or cutting tool axially of the rotating cylindrical work piece. The tool holder assembly may be repositioned with the side wall of the cross slide plate at the front wall of the housing, whereupon the slide rods then extend parallel to the housing wall, and the tool holder plate moves parallel to the housing wall, advancing the grinding or cutting tool radially of the rotating flat disc-like work piece.

It is therefore a principal object of the present invention to provide a tool holder assembly for a lathe which may be mounted in the lathe in one position for dressing a cylindrical wall of a work piece, and which may be mounted in another position for dressing a flat wall of a disc-like work piece.

Another object of the present invention is to provide a tool holder assembly as described which can grind the internal cylindrical wall of a brake drum or the external wall of a cylindrical work piece.

A further object of the present invention is to provide a tool holder assembly as described which can be set up in working position quickly, easily and accurately by relatively unskilled operator, loosening and tightening only a single screw.

A still further object of the present invention is to provide a tool holder assembly as described, which is relatively light in weight and which is relatively inexpensive as compared with prior complex and special purpose lathes.

These and other objects and many of the attendant advantages of this invention will be readily appreciated as the same becomes better understood by reference to the following detailed descriptions when considered in connection with the accompanying drawings in which.

Figure 1:
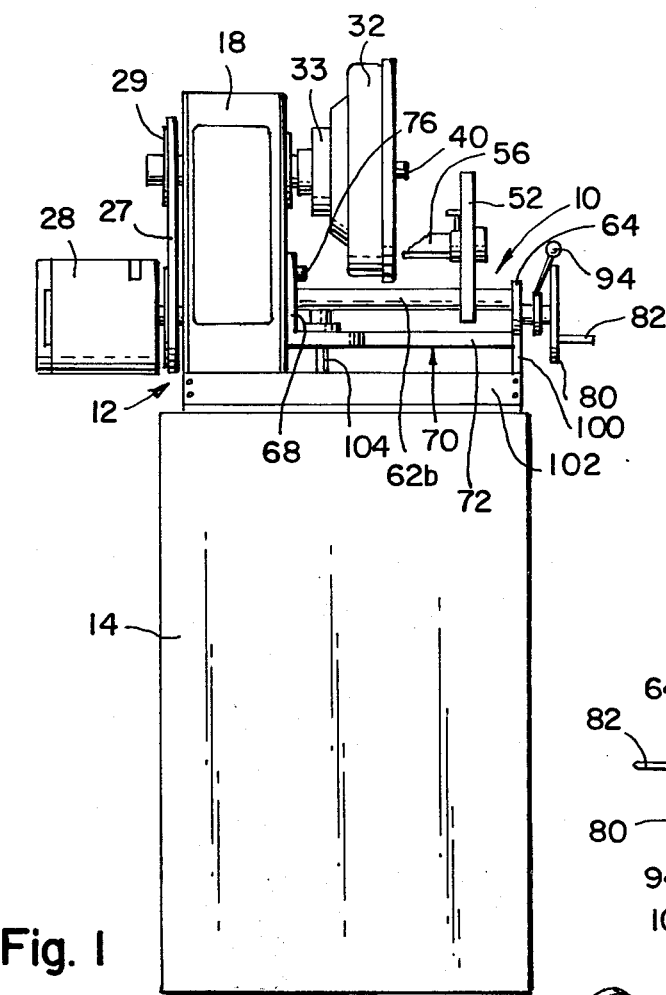
FIG. 1 is a side elevational view of a lathe equipped with a tool holder assembly embodying the present invention.

Referring now to the drawings wherein like reference characters designate like or corresponding parts throughout, there is illustrated in FIGS. 1–6 a tool holder assembly generally designated as reference numeral 10 installed in a lathe 12. The lathe 12 comprises a stand 14 on which is mounted a generally rectangular housing 16 having an inverted U-shaped cover 18 and a bottom plate (not shown). At the front of the cover 18 is a vertical rectangular front plate 22, which carries a bearing 24 through which extends a horizontal main shaft 26. An electric motor 28 mounted on a back wall 30 of the housing 16 is connected via a belt transmission (not shown) to rotate the shaft 26. The shaft 26 carries the work piece which may be either a drum 32 shown in FIGS. 1, 2, and 6 or a disc 34 shown in FIGS. 3 and 6. The drum 32 is held on the shaft 26 by adaptor members 33, 35, anti-chatter aligning plate 36, spacers 38, and a mounting screw 40, all described in greater detail in my copending patent application referred to above. When the disc 34 is substituted for the drum 32, adaptor members 33a, a 35a, and 35b are used instead of the adaptor members 33, 35.

Now according to the invention, the tool holder assembly 10 shown in FIGS. 1–6 comprises a tool holding plate 52 having notches 54 for receiving and engaging a tool holder 56 having a set screw 58 for holding a grinding or cutting tool bit 57 in the tool holder 56. The tool holder 56 is held in one of the notches 54 by a screw 53 and a threaded lock nut or knob 59 engaged on a threaded stud 61 of the tool holder 56. Alternatively a grinding tool 57' may be mounted directly on the plate 52; see FIG. 5.

The plate 52 has spaced holes 60 which slidably ride on horizontal slide rods 62a, 62b. Front ends of the rods 62a, 62b are secured in holes 63 of a front cross plate 64. Rear ends of the rods 62a, 62b are secured in holes 66 in a wall 68 of a tool holder mounting plate generally designated as reference numeral 70, which has two mutually perpendicular walls 68 and 72. The walls 68, 72 are formed with curved slots 74, 75 either one of which may be adjustably engaged by a screw 76 inserted in a threaded hole 77 the in plate 22 for mounting the plate 70 on the housing plate 22. When the wall 68 is abutted to the plate 22, the assembly 10 is positioned for dressing the drum 32 or other cylindrical work piece, and when the wall 72 is abutted to the plate 22, the assembly 10 is positioned for dressing the disc 34 or other flat work piece.

A handwheel 80 having a handle 82 is secured on a lead screw 84 which passes through centered holes 83, 83' in the plates 52 and 64. A coupling clutch bushing 86 having a plurality of rear fingers 87 is slidable axially on the rear end of the lead screw 84 and is held thereon by a set screw 86'. The bushing 86 has flanges 88 engaged by a yoke 90 carried by a rod 92 which may be moved axially by a front lever 94 connected to the front end of the rod 92. The yoke 90 moves the bushing 86 into and out of engagement with a pin 95 secured to a short shaft 96, which extends through a hole 97 in the wall 68 of the plate 70. When the assembly 10 is in the drum grinding position shown in FIGS. 1, 2, and 4, the shaft 96 is inserted through a journal 98 in the front wall 22 and is engaged with a belt and pulley transmission (not shown) in the housing 16 and driven by the motor 28. By the arrangement described, the handwheel 80 may be rotated manually to turn the lead screw 84 and advance the plate 52 toward the wall 68 or away from the wall 68, when the lead screw 84 is disengaged from the shaft 96 by operation of the clutch lever 94. When the lead screw 84 is engaged with the shaft 96 by operation of of lever 94 then the motor 28 drives the lead screw 84 to advance the tool holder plate 52 parallel to the axis of the shaft 26 carrying the drum 32. Manual rotation of the hand wheel 80 adjusts the starting position for the tool bit 57 at an inner wall 99 of the drum 32. When the assembly 10 is in drum dressing position, the front plate 64, which has a curved bottom edge, rests on a curved upper edge 101 of a stationary front tail stock plate 100, and is secured to a pair of side rails 102, 102' of the lathe 12. The side rails 102, 102' are secured to the front and rear walls 22, 30 of the housing 16.

Figure 3:
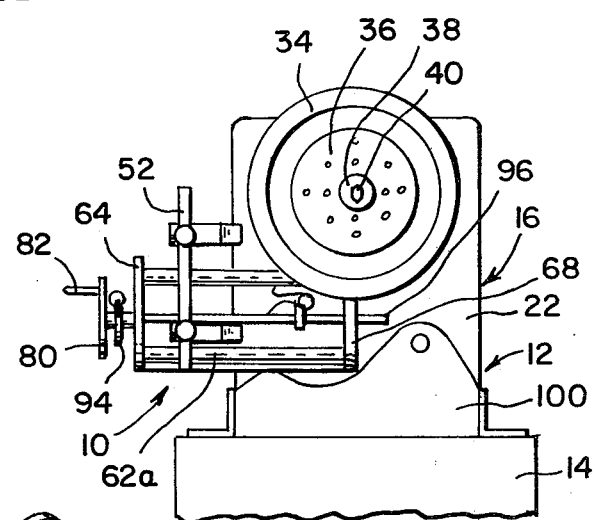
FIG. 3 is a front view of the uppper part of the lathe of FIG. 1 showing the tool holder assembly repositioned for dressing a side of a disc brake.

The tool holding assembly 10 is further provided with a short shaft 104 which extends through a journal 106 in side wall 72 of plate 70. The outer end of the shaft 104 projects from wall 72. The inner end of the shaft 104 carries a bevel gear 107, which is meshed with another bevel gear 108 secured on the shaft 96. When the assembly 10 is in drum grinding position, the gears 107, 108, and the shaft 104 turn idly. When the assembly 10 is turned 90° to place the wall 72 adjacent to the front plate 22, the shaft 104 is extended through the journal 98 of the plate 22 to the belt transmission 27, 29 driven by the motor 28 via the shaft 104, the gears 107, 108 and the shaft 96. The rear end portion of the shaft is withdrawn from the plate 22 as shown in FIG. 3, and is replaced by the shaft 104. By this arrangement, the hand wheel 80 operates as described above for manually adjusting the position of the plate 52. The tool bits 57' are now adjusted in position parallel to the plate 22 radially of the disc 34 on the shaft 26. Again the lever 94 may be operated to engage the shaft 96 with the lead screw 84 via the clutch bushing 86 as described above to permit the motor 28 to drive the lead screw 84 and the plate 52 automatically. Thus the rear face of the disc 34 may be dressed by the tool bits 57' moving radially of the disc face.

Figure 2:
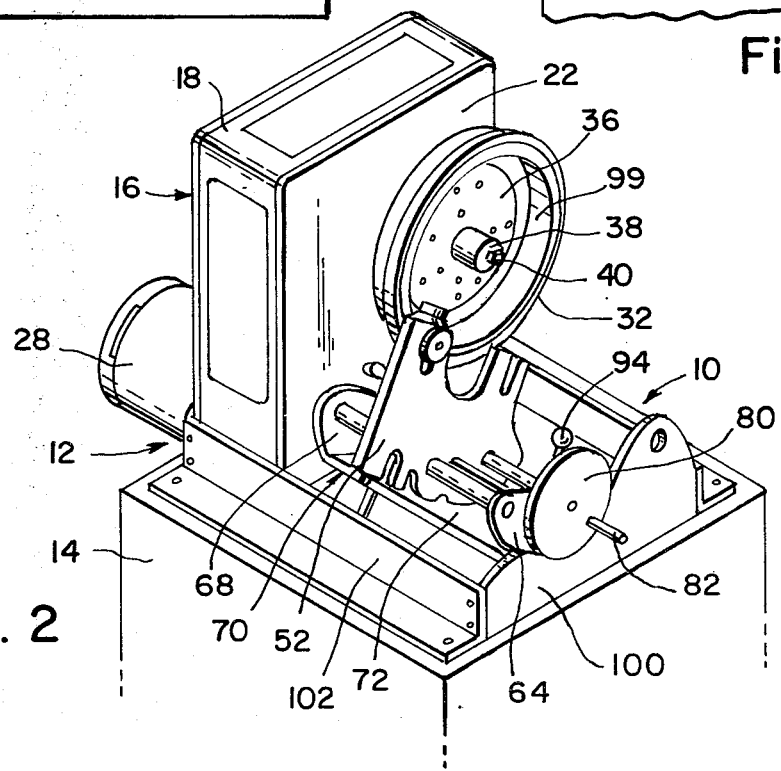
FIG. 2 is an oblique perspective view of the upper part of the lathe of FIG. 1 showing working parts of the tool holder assembly according to the invention, set in position for dressing the internal cylindrical wall of a brake drum.
Figure 4:
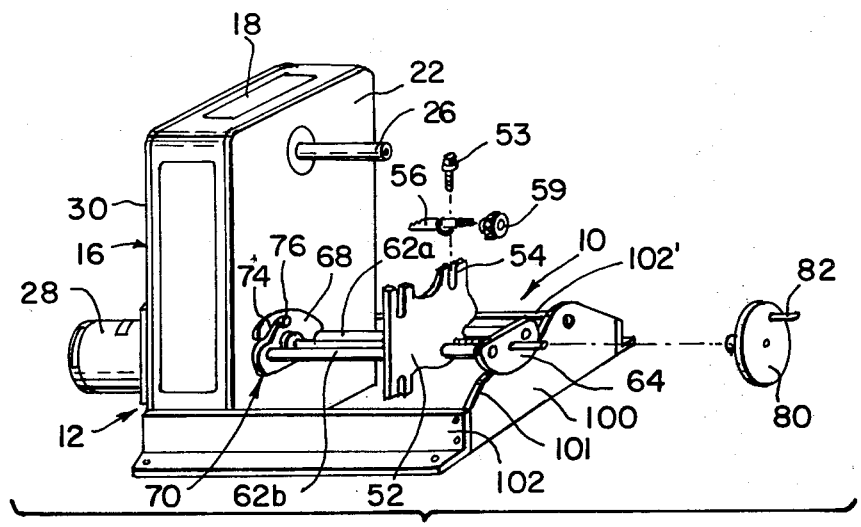
FIG. 4 is a perspective view of the upper part of the lathe with parts removed to show the tool holder in position for dressing a cylindrical drum.
Figure 5:
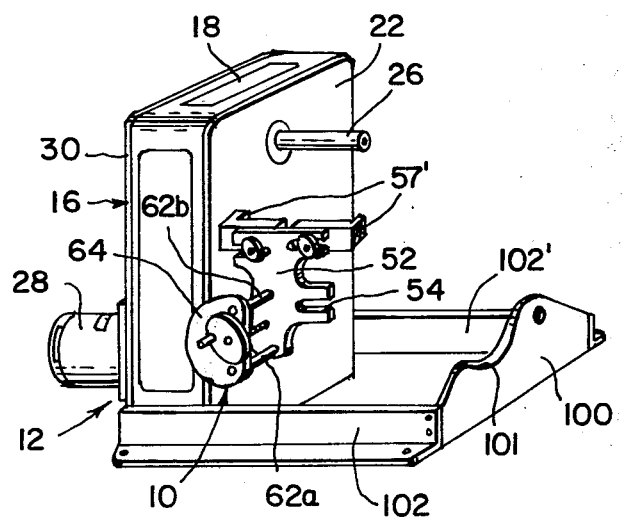
FIG. 5 is a perspective view of the upper part of the lathe, similar to FIG. 4, with parts removed, showing the tool holder in position for dressing a brake.
Figure 6:
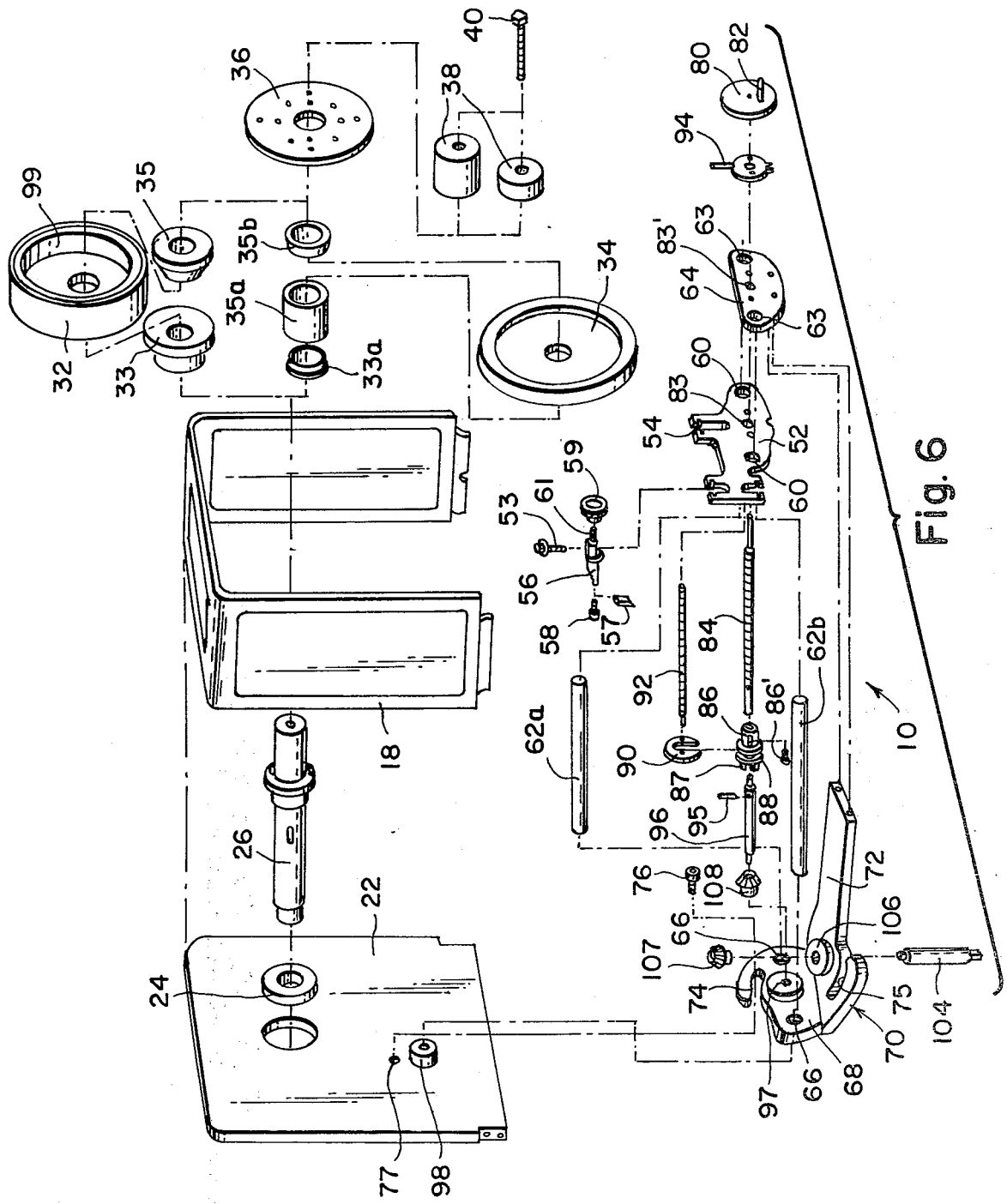
FIG. 6 is an exploded perspective view of parts of the lathe and tool holder assembly.

To change the position of the assembly 10 from the drum dressing position of FIGS. 1, 2, and 4 to the disc dressing position of FIGS. 3 and 5 and vice versa only the one screw 76 at the plate 22 need be loosened and tightened, since this single screw 76 engaged in the slot 74 or 75 holds the wall 68 or the wall 72 at the plate 22. The changeover requires no special skill and no special tools other than a wrench to loosen and tighten the screw. After the position of the assembly has been made from the drum dressing position in the disc dressing position, another tool holder 56 may be inserted in the other one of the notches 54 whereupon dressing of each face of the disc may proceed.

It should be understood that the foregoing relates to only a preferred embodiment of the invention which has been by way of example only and that is it intended to cover all changes and modifications of the example of the invention herein chosen for the purposes of the disclosure, which do not constitute departures from the spirit and scope of the invention.

The invention claimed is:

1. A tool holder assembly for dressing walls of cylindrical and flat disc shaped work pieces in a lathe having support means for rotatably supporting a work piece to be dressed, and motor means operatively arranged to rotate said work piece on an axis extending outwardly of said support means, comprising:

plate means mountable on said support means in different positions;

shaft means rotatably carried by said plate means and drivable by said motor means;

a mounting plate for holding a dressing tool;

slide means slidably carrying said mounting plate and secured to said plate means;

a lead screw rotatably engaged with said mounting plate to move the same along said slide means;

coupling clutch means operatively connecting said shaft means to said lead screw for rotating the same; and attachment means for mounting said plate means on said support means in a first one of said positions such that said mounting plate moves toward and away from said support means whereby said dressing tool moves axially of said work piece, and for mounting said plate means on said support means in a second one of said positions such that said mounting plate moves parallel to said support means whereby said dressing tool moves radially of said work piece.

2. A tool holder assembly as defined in claim 1, wherein said support means comprises a lathe housing having a front wall plate, and wherein said attachment means is a single screw engaged on said front wall plate.

3. A tool holder assembly as defined in claim 1, wherein said plate means comprises two mutually perpendicular walls respectively attachable to said support means in said first and said second positions.

4. A tool holder assembly as defined in claim 3, wherein said shaft means comprises first and second shafts respectively insertable in said support means and drivable by said motor means in said first and second positions of said plate means on said support means.

5. A tool holder assembly as defined in claim 4, wherein said support means comprises a lathe housing having a front wall plate, and wherein said attachment means is a single screw engageable on said front wall plate.

6. A tool holder assembly as defined in claim 5, further comprising manually operable means connected to said lead screw for manually turning the same to adjustably locate said dressing tool with respect to said work piece.

7. A tool holder assembly as defined in claim 6, wherein said coupling clutch means is slidably disposed on said lead screw and is selectively detachable from said shaft means to permit free manual rotation of said lead screw, and is attachable to said shaft means to enable rotation of said lead screw by said motor means, and further comprising lever means operatively connected to said coupling clutch means for selectively detaching said lead screw from said shaft means and attaching said lead screw to said shaft means.

8. A tool holder assembly as defined in claim 7, wherein said slide means comprises a pair of rods, and further comprising a cross plate secured to front ends of said rods; and a tail stock plate held in forward fixed position by said front wall plate of said lathe housing and disposed to support said cross plate when said mounting plate is in said first position for dressing a cylindrical work piece.

9. A tool holder assembly as defined in claim 8, wherein said walls of said plate means have curved slots for adjustably positioning said plate means on said single screw at said front wall plate of said lathe housing.

10. A tool holder assembly as defined in claim 9, further comprising a first gear carried by said first shaft, and a second gear carried by said shaft, both gears being mutually engaged, whereby said first shaft is driven by said second shaft when said second shaft is inserted through said front wall plate of said lathe housing and is there driven by said motor means, when said plate means is in said second position for dressing a disc shaped work piece.

* * * * *